United States Patent
Gauger et al.

(10) Patent No.: US 9,719,558 B2
(45) Date of Patent: Aug. 1, 2017

(54) AXIAL BEARING OR COMBINED AXIAL/RADIAL BEARING

(71) Applicant: Bosch Mahle Turbo Systems GmbH & Co. KG, Stuttgart (DE)

(72) Inventors: Stephan Gauger, Esslingen (DE); Fabian Haslinger, Mannheim (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 88 days.

(21) Appl. No.: 14/795,876

(22) Filed: Jul. 9, 2015

(65) Prior Publication Data
US 2016/0010684 A1    Jan. 14, 2016

(30) Foreign Application Priority Data

Jul. 10, 2014 (DE) .......................... 10 2014 213 466

(51) Int. Cl.
| | |
|---|---|
| F16C 32/06 | (2006.01) |
| F16C 17/04 | (2006.01) |
| F16C 33/10 | (2006.01) |
| F01D 25/16 | (2006.01) |
| F16C 17/10 | (2006.01) |

(52) U.S. Cl.
CPC .......... *F16C 17/047* (2013.01); *F01D 25/168* (2013.01); *F16C 33/1075* (2013.01); *F05D 2220/40* (2013.01); *F16C 17/10* (2013.01); *F16C 2360/24* (2013.01)

(58) Field of Classification Search
CPC .... F16C 17/047; F16C 17/10; F16C 33/1075; F16C 2360/24
See application file for complete search history.

(56) References Cited

U.S. PATENT DOCUMENTS

| | | | | |
|---|---|---|---|---|
| 2,731,305 A | * | 1/1956 | Wilcock | ................ F16C 17/047 384/307 |
| 3,232,680 A | * | 2/1966 | Clark | ..................... F16C 17/10 384/110 |

(Continued)

FOREIGN PATENT DOCUMENTS

| | | | |
|---|---|---|---|
| DE | EP 1998009 A1 * | 12/2008 | ........... F01D 25/166 |
| EP | 2140114 A2 | 1/2010 | |
| JP | 2000-186712 A | 7/2000 | |

OTHER PUBLICATIONS

English abstract for EP-2140114.
English abstract for JP2000-186712.
German Search Report for DE-102014213466.8, mailed Nov. 3, 2014.

*Primary Examiner* — Phillip A Johnson
(74) *Attorney, Agent, or Firm* — Fishman Stewart PLLC

(57) ABSTRACT

A bearing for a turbocharger may include an annular body and a centrally arranged passage opening for bearing a shaft at least one of axially and radially with respect to a rotation axis. The body may include at least one segment extending at least partially about the passage opening in a circumferential direction. The at least one segment may include an oil pocket, a circumferentially extending wedge surface and a detent surface circumferentially spaced from the oil pocket. The segment may also include a radially inner flange extending at least partially along the wedge surface in the circumferential direction. The inner flange may define an inner sealing web that may continue uninterruptedly into the detent surface.

20 Claims, 1 Drawing Sheet

(56) References Cited

U.S. PATENT DOCUMENTS

| | | |
|---|---|---|
| 3,495,886 A | 2/1970 | Roberts et al. |
| 3,512,854 A | 5/1970 | Harbage, Jr. |
| 4,326,758 A | 4/1982 | Nozue et al. |
| 4,348,065 A * | 9/1982 | Yoshioka ............ F16C 33/1075 384/121 |
| 4,383,771 A | 5/1983 | Freytag et al. |
| 4,522,513 A * | 6/1985 | Nozue .................... F16C 17/18 384/368 |
| 4,639,148 A | 1/1987 | Tamura et al. |
| 5,951,169 A * | 9/1999 | Oklejas ............... F16C 33/1065 384/123 |
| 5,980,114 A * | 11/1999 | Oklejas, Jr. ........... F04D 29/041 384/123 |
| 8,834,029 B2 * | 9/2014 | Laubender ............ F16C 17/047 384/121 |
| 2006/0165325 A1 * | 7/2006 | Link .................... F01D 25/168 384/123 |
| 2011/0038716 A1 * | 2/2011 | Frankenstein ........ F01D 25/168 415/170.1 |

* cited by examiner

AXIAL BEARING OR COMBINED AXIAL/RADIAL BEARING

CROSS-REFERENCE TO RELATED APPLICATIONS

This application claims priority to German Patent Application No. 10 2014 213 466.8, filed Jul. 10, 2014, the contents of which are hereby incorporated by reference in their entirety.

TECHNICAL FIELD

The present invention relates to an axial bearing or a combined axial/radial bearing, in particular for an exhaust gas turbocharger, which has substantially a disc-shaped or cylindrical shape. The invention furthermore relates to an exhaust gas turbocharger with at least one such axial bearing or one such combined axial/radial bearing.

BACKGROUND

Due to prospective stricter exhaust gas regulations, measures are being increasingly sought in order to be able to reduce the $CO_2$ emission of internal combustion engines. A current measure for this is the reduction of consumption through downspeeding/downsizing combined with an exhaust gas turbocharging. The exhaust gas turbocharger generally has here a hydrodynamic sliding bearing, which is divided into an axial and radial bearing. In order to be able to further reduce the $CO_2$ emission of turbocharged internal combustion engines, in particular an optimized mounting of a rotor in an exhaust gas turbocharger is helpful.

From EP 2 140 114 B1 a generic axial bearing is known with a substantially disc-shaped shape with a first and second side, which has a centrally arranged passage opening for a shaft. Furthermore, the known axial bearing has at least one at least partially or completely circumferential segment section on the first and the second side of the axial bearing, wherein the respective segment section is constructed as a depression, arranged concentrically around the passage opening, in the respective side of the axial bearing and in the respective segment section at least one bearing segment, having a contact surface, is arranged. Furthermore, at least one oil pocket is provided, which is arranged radially outside the segment section, and a slot-shaped opening, open towards to the first side, which is arranged and constructed such that it connects at least one oil pocket for an oil supply to the contact surfaces of the bearing segments on both sides of the axial bearing with the at least in each case one segment section on the first and the second side of the axial bearing. Hereby, in particular in the case of a cold start of the internal combustion engine, a sufficient lubrication is to be guaranteed.

SUMMARY

The present invention is concerned with the problem of indicating for an axial bearing of the generic type an improved or at least an alternative embodiment, by which in particular friction losses can be minimized with simultaneously defined loading capacity.

This problem is solved according to the invention by the subject of the independent claims. Advantageous embodiments are the subject of the dependent claims.

The present invention is based on the general idea of equipping an axial bearing or a combined axial/radial bearing with a substantially disc-shaped or cylindrical shape and a first and a second side and with a centrally arranged passage opening for a shaft with an oil pocket in the manner of a segment of a circle, to which a wedge surface adjoins in the manner of a segment of a circle in circumferential direction. This wedge surface in turn opens into a raised detent surface/contact surface, wherein additionally an inner flange is provided, running in the form of a ring segment, which is constructed as a sealing web and can be configured freely over the circumference, preferably, however, continues uninterruptedly into the detent surface or respectively contact surface. The essence of the invention is formed here by the inner flange (sealing web) on the inner side, which with a pressure build-up in the wedge surface of the axial bearing or of the combined axial/radial bearing brings about a lower pressure drop inwards and thereby distinctly increases the loading capacity of the axial bearing or respectively of the combined axial/radial bearing. Thereby, for a fixedly defined loading capacity, the axial bearing/axial/radial bearing can be configured smaller compared with the conventional embodiment, whereby the friction losses are reduced. In addition also an undesired discharge of the lubricant through the passage opening is at least reduced and thereby the mounting is improved. Through the reduced friction with identical loading capacity of the axial bearing/axial/radial bearing, the fuel consumption of the internal combustion engine is reduced and therefore indirectly also its $CO_2$ emission. Compared with alternative smooth-running bearings, such as roller bearings for example, the axial bearing/axial/radial bearing according to the invention offers the advantage, however, of being able to be produced comparatively cost-efficiently.

In an advantageous further development of the solution according to the invention, the wedge surface has a continuous or discontinuous incline in circumferential direction. Through a continuous incline, a continuous pressure build-up is made possible, whilst through a discontinuous incline for example firstly a collecting of lubricant, in particular oil, with a subsequent rapid pressure build-up can be achieved.

In a further advantageous embodiment of the solution according to the invention, an outer flange, running at least in the form of a ring segment, is provided, which is also constructed as a sealing web. Through an outer flange constructed in such a manner, the lubricant or respectively oil necessary for lubrication or respectively for bearing can be concentrated between the inner and the outer sealing flange, without an excessive oil discharge over the inner edge or respectively the outer edge of the axial bearing/axial/radial bearing having to be feared here.

Expediently, the inner flange continues, flush with the surface, into the detent surface. The inner flange can, however, also already terminate in front of the detent surface. The inner flange and the detent surface lie, furthermore, preferably in a plane, so that the wedge surface is constructed obliquely to the inner flange and obliquely to the detent surface. A transition between the wedge surface and the inner flange can be embodied here in a rounded manner or by means of a kink.

In a further advantageous embodiment of the solution according to the invention, the axial bearing or respectively the axial/radial bearing has at least on the first side three oil pockets, three detent surfaces, three wedge surfaces and three sealing webs.

Of course, the same number of oil pockets or respectively detent surfaces and wedge surfaces can also be arranged here on the second side. The oil pockets are arranged offset to one another here in circumferential direction through 120° and are arranged in mirror-inverted manner to the oil pockets on the opposite side of the axial bearing/axial/radial bearing. Of course, four or more such bearing components (oil pockets, wedge surfaces and detent surfaces) can also be provided here, and the geometric arrangement can be varied.

The present invention is further based on the general idea of equipping an exhaust gas turbocharger with at least one axial bearing or respectively combined axial/radial bearing described in the previous paragraphs. Hereby, it is possible to achieve a distinctly reduced friction with identical loading capacity of the axial bearing, whereby the mounting of the rotor of the exhaust gas turbocharger as a whole is improved and thereby less exhaust gas enthalpy and, connected therewith, less fuel, is required for the drive thereof. Through the reduction of the fuel consumption, also a reduction of the $CO_2$ emission of the internal combustion engine is achieved.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown here, respectively diagrammatically.

DETAILED DESCRIPTION

Figure 1:
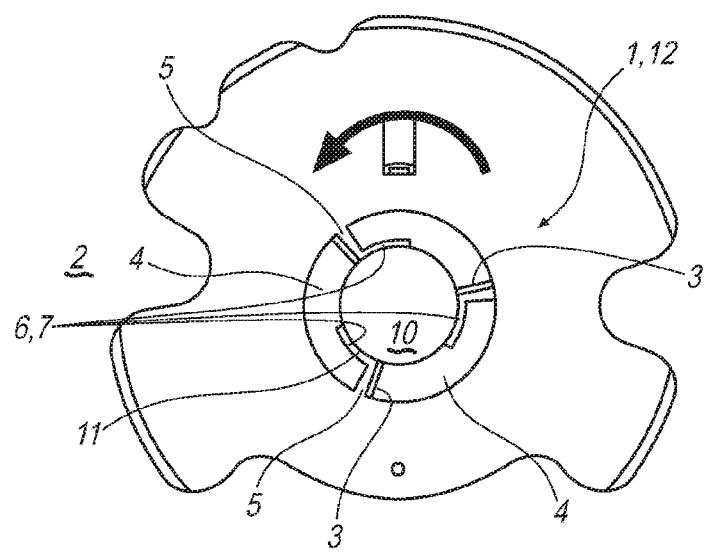
FIG. 1 a view onto an axial bearing/axial/radial bearing according to the invention in an exhaust gas turbocharger, FIG. 2 an oblique view onto the axial bearing/axial/radial bearing according to the invention, FIG. 3 an illustration as in FIG. 2, but from a different perspective, FIG. 4 a detail view of the axial bearing/axial/radial bearing.
Figures 2, 3:
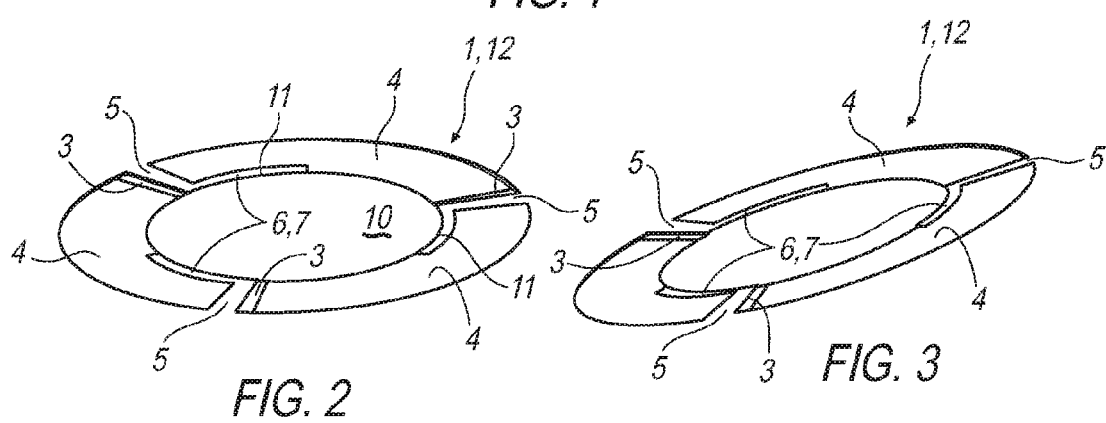

According to FIGS. 1 to 4, an axial bearing 1 or a combined axial/radial bearing 12 according to the invention, in particular for an exhaust gas turbocharger 2, has a substantially disc-shaped or cylindrical shape with a first and a second side. According to the invention, the axial bearing 1 or respectively the axial/radial bearing 12 has here, arranged in succession in circumferential direction, an oil pocket 3 in the manner of a segment of a circle, a wedge surface 4 adjoining thereto in the manner of a segment of a circle, and a detent surface 5 adjoining the wedge surface 4. Often, below, reference is made only to the axial bearing 1, wherein of course it is clear that the comments made with regard to the axial bearing 1 are able to be applied in an identical manner to the radial/axial bearing 12 according to the invention, which in particular can be constructed in one piece with the axial bearing 1. An inner flange 6, running in the form of a ring segment, is also provided, which is constructed as a sealing web 7 and continues preferably uninterruptedly into the detent surface 5. With an axial bearing 1 constructed in such a manner, the friction can be distinctly reduced with identical loading capacity, and hence a distinctly more smooth-running mounting of a rotor of an exhaust gas turbocharger 2 can be achieved, which in turn leads to the lowering of the fuel consumption and hence also to a lowering of the $CO_2$ emission.

The wedge surface 4 can have here a continuous or discontinuous incline in circumferential direction and rises from the lowest point, i.e. from the oil pocket 3 towards the highest point, i.e. the detent surface 5. An outer flange 8 (cf. FIG. 4), running at least in the form of a ring segment, is also provided, which is constructed as a sealing web 9.

All the illustrated embodiments of the axial bearing 1/axial/radial bearing 12 have in common that the detent surface 5 runs in radial direction and the inner flange 6 continues, flush with the surface, into the detent surface 5. A transition between the wedge surface 4 and the detent surface 5 can be configured here by means of a kink or by being rounded.

The inner flange 6 in turn continues substantially at right angles into the detent surface 5, wherein the inner flange 6, constructed as sealing web 7, enables a smaller pressure drop inwards on the pressure build-up, whereby the loading capacity of the axial bearing 1 can be distinctly increased. A passage opening 10 for a shaft, which is not shown, of the exhaust gas turbocharger 1 is arranged centrally on the axial bearing 1. The incline of the wedge surface 4 is not established from the outset here, but rather can be selected individually according to the embodiment of the exhaust gas turbocharger 2 and the required bearing characteristics. In the same manner, a sealing surface 11 on the inner flange 6, the oil pocket 3 or respectively the detent surface 5 are also able to be varied as required with regard to their dimensions and are thereby able to be optimized.

As can be seen from the illustrated embodiments of the axial bearing 1/axial/radial bearing 12, this has, uniformly distributed in circumferential direction, three oil pockets 3, three detent surfaces 5 and three wedge surfaces 4 and three sealing webs 7 with associated inner flange 6. Of course, also more or fewer (for example one or two) oil pockets 3, detent surfaces 5, wedge surfaces 4, etc. can also be provided here, paired respectively.

An exhaust gas turbocharger 2 can also be equipped with an axial bearing 1 and/or a combined axial/radial bearing 12 according to the invention with at least one such axial bearing 1.

Figure 4:
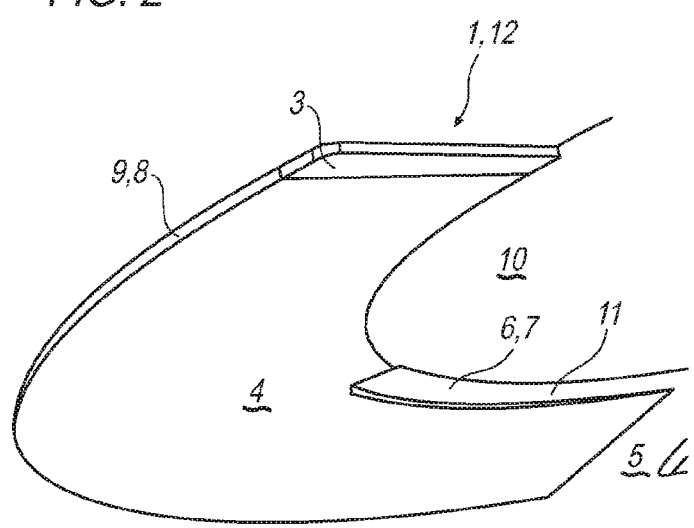

Observing for example FIG. 4, it can be seen that at least the wedge surface 4 shown there and the detent surface 5 shown there 5 touch the inner flange 6 and/or the outer flange 8, i.e. contact these directly. The detent surface 5 continues in addition uninterruptedly and flush into the inner flange 6 and the outer flange 8 and therefore into the two sealing webs 7, 9.

In particular, there is no gap between the detent surface 5 or respectively the wedge surface 4 and the inner flange 6 and/or the outer flange 8. The two sealing webs 7, 9, i.e. the two flanges 6, 8 therefore not only fulfill a sealing function, but also influence the pressure build-up in the region of the wedge surface 4.

With the axial bearing 1/axial/radial bearing 12 according to the invention a particularly smooth-running mounting of a shaft and hence of a rotor of an exhaust gas turbocharger 2 in axial direction is possible, whereby the friction and hence indirectly also the fuel consumption and, connected therewith, the $CO_2$ emissions of an internal combustion engine can be reduced. Furthermore, the axial bearing 1/axial/radial bearing 12 according to the invention can be produced cost-efficiently, for example as a sheet metal shaped part.

The invention claimed is:

1. A bearing for turbocharger, comprising: an annular body and a centrally arranged passage opening defining a rotation axis for bearing a shaft at least one of axially and radially with respect to the rotation axis, the body including at least one segment extending at least partially about the passage opening in a circumferential direction of the rotation axis, wherein the at least one segment includes:
   an oil pocket;
   a circumferentially extending wedge surface adjoining the oil pocket;
   a detent surface adjoining the wedge surface and circumferentially spaced from the oil pocket, the detent surface disposed axially raised with respect to the wedge surface;
   a radially inner flange extending at least partially along the wedge surface in the circumferential direction, the inner flange defining an inner sealing web continuing uninterruptedly into the detent surface; and
   wherein the wedge surface extends at an incline along the circumferential direction and defines a kinked transition into the detent surface.

2. The bearing according to claim 1, wherein the incline of the wedge surface extends continuous in the circumferential direction from the oil pocket to the detent surface to facilitate a continuous pressure build up towards the detent surface.

3. The bearing according to claim 1, wherein the at least one segment further includes a radially outer flange extending at least partially along the wedge surface in the circumferential direction, the outer flange defining an outer sealing web.

4. The bearing according to claim 1, wherein the detent surface extends completely along the wedge surface in a radial direction.

5. The bearing according to claim 1, wherein the inner flange and the detent surface are disposed on a plane such that the wedge surface is arranged obliquely to the inner flange and obliquely to the detent surface.

6. The bearing according to claim 1, wherein the inner flange continues into the detent surface at an angle perpendicular to the wedge surface.

7. The bearing according to claim 1, wherein the body on at least one axially facing side includes a plurality of segments disposed circumferentially about the passage opening, and wherein each segment includes the oil pocket, the detent surface circumferentially spaced from the oil pocket, the wedge surfaces disposed circumferentially between the oil pocket and the detent surface, and the radially inner flange defining the inner sealing web extending at least partially along the wedge surface.

8. The bearing according to claim 1, wherein the detent surface continues uninterruptedly and flush into at least one of the inner flange and a radially outer flange extending at least partially along the wedge surface in the circumferential direction.

9. The bearing according to claim 1, wherein the incline of the wedge surface extends discontinuous in the circumferential direction from the oil pocket to the detent surface to facilitate a rapid pressure build-up towards the detent surface.

10. The bearing according to claim 1, wherein the inner flange defining the inner sealing web is structured as a ring segment extending from the detent surface and terminating in the circumferential direction along the incline of the wedge surface to influence a pressure build-up in the wedge surface.

11. An exhaust gas turbocharger, comprising: at least one bearing having a central passage opening defining a rotation axis for bearing a shaft at least one of axially and radially with respect to the rotation axis, the bearing including at least one annular segment extending at least partially about the passage opening in a circumferential direction, of the rotation axis, wherein the at least one segment includes:
   an oil pocket;
   a circumferentially extending wedge surface;
   a detent surface circumferentially spaced from the oil pocket via the wedge surface, the detent surface disposed axially raised with respect to the wedge surface; and
   a radially inner flange extending at least partially along the wedge surface in the circumferential direction, the inner flange defining an inner sealing web continuing uninterruptedly along the wedge surface into the detent surface; and
   wherein the wedge surface extends at an incline along the circumferential direction and defines a kinked transition into the detent surface.

12. The exhaust gas turbocharger according to claim 11, wherein the incline of the wedge surface extends discontinuous in the circumferential direction from the oil pocket to the detent surface to facilitate a rapid pressure build-up towards the detent surface.

13. The exhaust gas turbocharger according to claim 11, wherein the incline of the wedge surface extends continuous in the circumferential direction from the oil pocket to the detent surface to facilitate a continuous pressure build-up.

14. The exhaust gas turbocharger according to claim 11, wherein the at least one segment further includes a radially outer flange extending at least partially along the wedge surface in the circumferential direction, the outer flange defining an outer sealing web.

15. The exhaust gas turbocharger according to claim 11, wherein the inner flange defining the inner sealing web is structured as a ring segment extending from the detent surface and terminating along the incline of the wedge surface in the circumferential direction to influence a pressure build-up in the wedge surface.

16. The exhaust gas turbocharger according to claim 11, wherein the wedge surface is arranged obliquely to the inner flange and obliquely to the detent surface.

17. The exhaust gas turbocharger according to claim 11, wherein the bearing on at least one axially facing side includes a plurality of segments disposed circumferentially about the central passage opening, and wherein each segment includes the oil pocket, the detent surface circumferentially spaced from the oil pocket, the wedge surface disposed circumferentially between the oil pocket and the detent surface, and the radially inner flange defining the inner sealing web extending at least partially along the wedge surface.

18. The exhaust gas turbocharger according to claim 11, wherein the detent surface continues uninterruptedly and flush into at least one of the inner flange and a radially outer flange extending at least partially along the wedge surface in the circumferential direction.

19. A bearing for an exhaust gas turbocharger, comprising:
   an annular body having a central passage opening defining a rotation axis for bearing a shaft at least one of axially and radially with respect to the rotation axis, the body including at least one annular segment extending at least partially about the central passage opening in a circumferential direction of the rotating axis, wherein the at least one segment includes:

an oil pocket;

a detent surface circumferentially spaced from the oil pocket;

a wedge surface extending circumferentially between the oil pocket and the detent surface; and a radially inner flange extending partially along the wedge surface in the circumferential direction, wherein the inner flange extends uninterruptedly into the detent surface and is spatially isolated in the circumferential direction from the oil pocket via the wedge surface;

wherein the wedge surface defines an incline in the circumferential direction from the oil pocket to the detent surface, and the inner flange terminates in the circumferential direction from the detent surface along the incline of the wedge surface to influence a pressure build-up in the wedge surface during operation.

20. The bearing according to claim 19, wherein the detent surface is axially raised with respect to the wedge surface, and wherein a kinked transition is defined between the wedge surface and the detent surface.

\* \* \* \* \*